(12) United States Patent
Baiye

(10) Patent No.: US 8,260,698 B2
(45) Date of Patent: Sep. 4, 2012

(54) SYSTEM AND METHOD FOR PROCESSING DATA RELATED TO AN ANNUITY USING AN INDEX-BASED AMOUNT TO CREDIT TO A CONTRACT VALUE

(75) Inventor: Simpa Baiye, Simsbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/182,741

(22) Filed: Jul. 14, 2011

(65) Prior Publication Data

US 2011/0270781 A1    Nov. 3, 2011

Related U.S. Application Data

(63) Continuation of application No. 11/986,962, filed on Nov. 27, 2007, now Pat. No. 7,996,291.

(60) Provisional application No. 60/899,052, filed on Feb. 2, 2007.

(51) Int. Cl.
*G06Q 40/00* (2006.01)
(52) U.S. Cl. ........................ 705/35; 705/36 R
(58) Field of Classification Search .............. 705/4, 35, 705/36 T, 36 R, 38, 39, 40
See application file for complete search history.

(56) References Cited

U.S. PATENT DOCUMENTS

| | | | |
|---|---|---|---|
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,275,807 B1 * | 8/2001 | Schirripa | 705/36 R |
| 6,611,808 B1 | 8/2003 | Preti et al. | |
| 6,611,815 B1 | 8/2003 | Lewis et al. | |
| 6,636,834 B1 * | 10/2003 | Schirripa | 705/36 R |
| 6,950,805 B2 | 9/2005 | Kavanaugh | |
| 6,963,852 B2 | 11/2005 | Koresko, V | |
| 7,016,871 B1 | 3/2006 | Fisher et al. | |
| 7,080,032 B2 * | 7/2006 | Abbs et al. | 705/35 |

(Continued)

OTHER PUBLICATIONS

Shapiro et al. "Separating Annuity Buyers by Fixed Vs. Variable" Apr. 5, 1993, National Underwriter (Life.Health.Financial Serviecs), V97N14 pp. 20-21.*

(Continued)

*Primary Examiner* — Kelly Campen
(74) *Attorney, Agent, or Firm* — Howard IP Law Group, PC

(57) ABSTRACT

A computer system having a processor and a data storage device for processing data related to an annuity product, the annuity product having a contract value and an interest rate. The processor is configured to determine an amount of interest for crediting to the contract value based on the contract value and the value of the interest rate; determine a difference between the current value of an index independent of the value of any financial instrument and the prior period value of the index; based on the determined difference between the current value of the index and the prior period value of the index, determine a value of an additional amount for crediting to the contract value; and, based on the contract value, the amount of interest for crediting and the value of the additional amount for crediting, determine an updated contract value.

20 Claims, 7 Drawing Sheets

U.S. PATENT DOCUMENTS

| | | | |
|---|---|---|---|
| 7,089,201 | B1 | 8/2006 | Dellinger et al. |
| 7,113,913 | B1 | 9/2006 | Davis et al. |
| 7,376,608 | B1* | 5/2008 | Dellinger et al. .......... 705/36 R |
| 7,398,241 | B2* | 7/2008 | Fay et al. .................... 705/36 R |
| 2001/0014873 | A1 | 8/2001 | Henderson et al. |
| 2001/0047325 | A1 | 11/2001 | Livingston |
| 2002/0035527 | A1 | 3/2002 | Corrin |
| 2002/0174045 | A1 | 11/2002 | Arena et al. |
| 2002/0188540 | A1* | 12/2002 | Fay et al. ........................ 705/36 |
| 2003/0088430 | A1 | 5/2003 | Ruark |
| 2003/0105652 | A1 | 6/2003 | Arena et al. |
| 2003/0120570 | A1 | 6/2003 | Dellinger et al. |
| 2003/0171956 | A1 | 9/2003 | Cox et al. |
| 2003/0187764 | A1 | 10/2003 | Abbs et al. |
| 2004/0039608 | A1 | 2/2004 | Mazur et al. |
| 2004/0088236 | A1 | 5/2004 | Manning |
| 2004/0181436 | A1 | 9/2004 | Lange |
| 2004/0204951 | A1 | 10/2004 | Wood et al. |
| 2004/0267647 | A1 | 12/2004 | Brisbois |
| 2005/0010453 | A1 | 1/2005 | Terlizzi et al. |
| 2005/0060251 | A1 | 3/2005 | Schwartz et al. |
| 2005/0240521 | A1* | 10/2005 | Fuentes-Torres ............... 705/39 |
| 2006/0080148 | A1 | 4/2006 | Koresko, V |
| 2006/0089892 | A1 | 4/2006 | Sullivan et al. |
| 2006/0095353 | A1 | 5/2006 | Midlam |
| 2006/0111997 | A1* | 5/2006 | Abbott et al. .................. 705/35 |
| 2006/0111998 | A1 | 5/2006 | Fisher et al. |
| 2006/0143055 | A1 | 6/2006 | Loy et al. |
| 2006/0149651 | A1 | 7/2006 | Robinson |
| 2006/0155622 | A1 | 7/2006 | Laux |
| 2006/0195375 | A1 | 8/2006 | Bohn |
| 2006/0206398 | A1 | 9/2006 | Coughlin |
| 2006/0206401 | A1 | 9/2006 | Abbs et al. |
| 2006/0212379 | A1 | 9/2006 | Perg et al. |
| 2006/0212380 | A1 | 9/2006 | Williams et al. |
| 2007/0011063 | A1 | 1/2007 | Shelon et al. |
| 2007/0011069 | A1 | 1/2007 | Bevacqua, Jr. |
| 2007/0011086 | A1 | 1/2007 | Dellinger et al. |
| 2007/0078690 | A1 | 4/2007 | Kohl |
| 2007/0100715 | A1 | 5/2007 | O'Donnell et al. |
| 2007/0100720 | A1 | 5/2007 | Bonvouloir |
| 2007/0100726 | A1 | 5/2007 | O'Flinn et al. |
| 2007/0100727 | A1* | 5/2007 | Multer et al. ............... 705/36 R |
| 2007/0106589 | A1 | 5/2007 | Schirripa |
| 2007/0162380 | A1 | 7/2007 | Conroy |
| 2007/0198377 | A1 | 8/2007 | Livingston et al. |

OTHER PUBLICATIONS

Anonymous "Q2 2005 American EQTY INVT LIFE HLD CO Earnings Conference Call-Final" Aug. 4, 2005, Fair Disclosure Wire.*

"Fidelity.com Glossary"; https://scs.fidelity.com/webxpress/help/topics/help_definition_p.shtml, no later than Jul. 23, 2007.

"Accelerated Death Benefits" http://www.medicare.gov/LongTermCare/Static/AceDeathBenefits.asp?dest=NAV%.

"Alternatives to Long Term Care Insurance" http://www.senior-wealth-protection-advocates.com/long-term-care-insurance-alternatives.html.

Stout, R.G. et al.; "Dynamic Retirement Withdrawal Planning"; Financial Services Review 15 (2006) 117-131.

"Glossary of Insurance Terms" (Life Office Management Association, Inc. 2002) http://www.iii.org/media/glossary/.

"Income Select for Life"; https://www.tran.samericaadvisor.cony/contentServer/MediaServer? uri=/site/tciidex/media/PDF/Annuities_TCI/Client_Approved_Material/Tips_and_Technigues/.
BRIS.pdf; May 2007.

"Jackson Enhances Living Benefit Options within its Perspective Family of Variable Annuities"; http://findarticles.com/p/articles/mi_m0EiN/is_2007_April_30/ai_n19041944.

"Just the Facts"; (Nationwide Financial Services, Inc. 2006-2007) https://ssc.nwservicecenter.com/media/pdf/product/VAM-0504AO-F1.pdf.

"Key to Making Retirement Savings Last: The Withdrawal Rate"; (New York Life Insurance Company 2007) http://www.newyorklife.com/cda/0,3254,141.98,00.html.

"Lifetime Legacy" http://www.americo.com/lifetime/lifetimelegacy.html, no. later than Jul. 23, 2007.

"Making IRAs Last a Lifetime with Annuities"; (Life Health Advisor, Mar. 2006) http://www.fpamd.org/documents/MakingIRAsLastaLifetimewithAnnuities.pdf.

Pacific Life Individual(k) Program; (Nov. 2007) https://annuities.myaccount.pacificlife.com/public/corporate/product_info/pos/guide.

"Prudential Investments Introduces Strategic Partners Annuity One; New Variable Annuity Offers Investors World-Class Money Managers and Flexible Product Features"; (Business Wire Oct. 9, 2000) http://findarticles.com/p/articles/mi_m0EIN/is_2000_Oct 9/ai_65846822.

"Retireonyourterms"; http://www.retireonyourterms.com/glossary/GlossaryText.htm, Jul. 23, 2007.

"RiverSource Innovations Select Variable Annuity"; http://www.riversource.com/rvsc/global/docs/INNOV-SELECT-NY-AAG.pdf.

"The Power and Protection of Income Annuities", (Empire Fidelity Investments Life Insurance Company), http//personal.fidelity.com/products/annuities/pdf/IncomeAnnuitySpecialReport.pdf, Mar. 2006.

Form 485BPOS, (Apr. 26, 2006), Transamerica-NewLTC-LifetimeGMWB_May2006SECFiling.pdf.

Form 497, (Oct. 2, 2006), Penn-EnhancedCreditVApMay2001pProspectus.pdf.

Form N-4, (Feb. 22, 2006), Transamerica-NewLTC-LifetimeGMWB_SECFiling.pdf.

Prospectus, Penn Mutual Variable Annuity Account III 69 I (Penn Mutual May 1, 2007), PennMutual-LifetimeGMWB-CPISECFiling.pdf.

Shapiro et al. "Separating Annuity Buyers by Fixed Vs. Variable" Apr. 5, 1993, National Underwriter Life.health.Financial Services), V97N14 pp. 20-21.

Allstate Treasury-Linked Annuity; Sales Ideas; Lincoln Benefit Life, an Allstate Company; Apr. 2006.

* cited by examiner

SYSTEM AND METHOD FOR PROCESSING DATA RELATED TO AN ANNUITY USING AN INDEX-BASED AMOUNT TO CREDIT TO A CONTRACT VALUE

CROSS-REFERENCE TO RELATED APPLICATIONS

This is a continuation application of and claims priority to copending U.S. patent application Ser. No. 11/986,962, filed Nov. 27, 2007, which claims benefit of U.S. Provisional Application Ser. No. 60/899,052, filed Feb. 2, 2007, the entirety of each of the foregoing applications being hereby incorporated by reference herein for all purposes.

BACKGROUND OF THE INVENTION

1. Field of the Invention

The present invention relates to a method and system for providing an annuity with periodic interest rate adjustments; and more particularly, to a data processing method for administering an annuity product for an annuitant, the annuity product having a contract value and a guaranteed minimum interest rate.

2. Description of the Prior Art

An immediate annuity is typically used to provide an income stream within a predetermined length of time from the date the premium is received. The amount of income can be either fixed or variable in nature and typically, these products do not provide an account value. A deferred annuity is typically used to provide accumulation and, potentially, a future stream of annuity income. The deferred annuity comprises an accumulation period during which the account value will vary with the underlying investments and an annuitization period where the client purchases an immediate annuity with the account value available. Deferred and immediate annuities typically provide guaranteed income for life, which transfers some portion or all of the risk of outliving one s accumulated assets to the insurer.

One basis for distinguishing commonly available deferred annuities is whether the annuity is classified as a fixed annuity or a variable annuity.

In a fixed annuity, the insurer guarantees a fixed rate of interest applicable to each annuity deposit. Therefore, a fixed annuity is desirable for those seeking a safe investment. The guaranteed interest rate may apply for a specified period of time, often one year or more. Often, a rate guaranteed for more than one year is called a multiyear guarantee. The rate credited on a fixed annuity is reset periodically, moving in an amount and a direction that correlate the yields available on fixed-income investments available to the insurer.

With a variable annuity, the annuity contract owner bears the investment risk. The relevant life typically has a choice of funds in which he/she can direct where the annuity deposits will be invested. The various funds or sub-accounts may include stocks, bonds, money market instruments, mutual funds, and the like.

Variable annuity contracts typically provide a death benefit. Oftentimes, during the accumulation period this death benefit is related to the contract value. That is, if the sub-accounts backing the contract value have performed poorly, then the death benefit may be reduced to an insignificant amount. After annuitization, the death benefit can be a function of the remaining payments of the annuity at the time of the relevant life s death. Further, if the annuity contract does not provide a guarantee (discussed below), the contract will terminate when the contract value goes to zero or some other amount specified in the contract or rider.

Annuity contracts may also provide guarantees in several different variations. A Guaranteed Minimum Death Benefit (GMDB) is a guarantee that provides a minimum benefit at the death of the relevant life regardless of the performance of the underlying investments. A Guaranteed Minimum Income Benefit (GMIB) is a guarantee that will provide a specified income amount at the time the contract is annuitized. The income payment will be dependent on previously stated details set out in the contract. A Guaranteed Minimum Accumulation Benefit (GMAB) is a benefit that guarantees a specified contract value at a certain date in the future, even if actual investment performance of the contract is less than the guaranteed amount. A Guaranteed Minimum Withdrawal Benefit (GMWB) is a guarantee of income for a specified period of time, and in some versions, the income stream is guaranteed for life without requiring annuitization as in the guaranteed minimum income benefit. However, this guarantee will automatically annuitize the contract if the contract value is reduced to zero or some other amount specified in the contract or rider.

Typically, a fixed annuity will guarantee a predetermined interest rate for a certain number of years. This guaranteed interest rate is usually determined by the company issuing the annuity product based on currently prevailing interest rates in the economy. Many annuity contract holders later become dissatisfied with their guaranteed interest rate if the prevailing interest rates in the economy suddenly increase because they feel as though they are locked into a poor investment. Many economists track inflation statistics. Inflation is defined as a persistent, substantial rise in the general level of prices related to an increase in the volume of money and resulting in the loss of value of currency. Typically, when the inflation rate of an economy is high, the prevailing market interest rates in the economy also increase.

Most annuity products in the prior art typically contain provisions for periodically increasing the interest rate in response to sudden increases in the prevailing interest rates in the economy. However, none of the prior art products employ a method and system for providing an annuity with periodic interest rate adjustments, wherein the method utilizes one or more reference values that are a very predictable indication of prevailing market interest rates.

Many financial products and systems have been disclosed. These include financial products with the following features: having a guaranteed rate of return for a guarantee period and having upward adjustments to the interest rate if there is a corresponding increase in a specified referenced rate (i.e., a United States Treasury rate); an annuity valuation product that applies different interest rates over different time periods that reflect changes in increasing, declining and steady interest rate environments; and administering a plan with guaranteed lifetime income. Each one of these prior art references suffers from at least the following disadvantage(s): these financial products do not provide for an annuity with periodic interest rate adjustments using reference values that can predictably indicate the prevailing market interest rates.

Accordingly, there remains a need in the art for a method and system for administering an annuity contract for a relevant life with periodic interest rate adjustments. In addition, there is a need for a data processing method wherein the annuity contract utilizes one or more reference values that are a very predictable indication of prevailing market interest rates, such as the consumer price index and short and long term Treasury notes.

SUMMARY OF THE INVENTION

The present invention provides a data processing method for administering an annuity contract for an annuitant wherein the annuity contract has a guaranteed minimum interest rate. Administration is such that the annuity product provides periodic interest rate adjustments. The adjustments are a function of changes in the prevailing market interest rates, based on reliable economic metrics such as the consumer price index and short and long term treasury notes.

In a first aspect of the present invention, a data processing method for administering an annuity contract for an annuitant is disclosed. The invention comprises a data processing method for administering an annuity contract for an annuitant, the annuity product having a contract value and a guaranteed minimum interest rate. The present method comprises the following steps: (i) determining a base contract value at the issue of the annuity contract; (ii) determining a guaranteed minimum interest rate; (iii) determining the consumer price index at the issue of the annuity contract and setting this value as the base consumer price index; and (iv) determining a bonus participation rate between 0% and 100%. Once the starting data values are determined, the method can run. The present method periodically pays a guaranteed interest payment to the present contract value, wherein the guaranteed interest payment is determined by the following formula:

Guaranteed Interest Payment=(the present contract value)×(the guaranteed minimum interest rate).

The present method periodically pays an inflation bonus to the present contract value, wherein the inflation bonus is determined based on the difference between the base consumer price index and the present consumer price index.

In a second aspect of the present invention, a data processing method for administering an annuity contract for an annuitant is disclosed, wherein the annuity contract has a contract value and a guaranteed minimum interest rate. The present method comprises the following steps: (i) determining a base contract value at the issue of the annuity product; (ii) determining a guaranteed minimum interest rate and setting this interest rate as the first year s interest rate; (iii) determining the difference between a long term treasury interest rate and a short term treasury interest rate at the issue of the annuity contract and setting this value as the first year s spread percentage; and, determining a spread participation rate between 0% and 100%. Once the starting data values are determined, the method can run. The present method periodically pays a guaranteed interest payment to the present contract value, wherein the guaranteed interest payment is determined by the following formula:

Guaranteed Interest Payment=(the present contract value)×(the interest rate), wherein the interest rate is determined by the following formula:

(the interest rate)=[(the previous year s interest rate)+
(the spread participation rate)×the greater of: (the
difference between the present long term Treasury interest rate and the present short term Treasury interest rate) minus (the previous year s
spread percentage); and Zero].

The present invention solves several of the problems associated with conventional administration of annuity contracts having a fixed interest rate. Maintenance of a minimum guaranteed interest rate with periodic interest rate adjustments aids an annuitant during periods of high interest rates in the market. At the same time, the annuitant is afforded increased security by maintenance of a guaranteed minimum interest rate.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DESCRIPTION OF THE PREFERRED EMBODIMENTS

Figure 1:
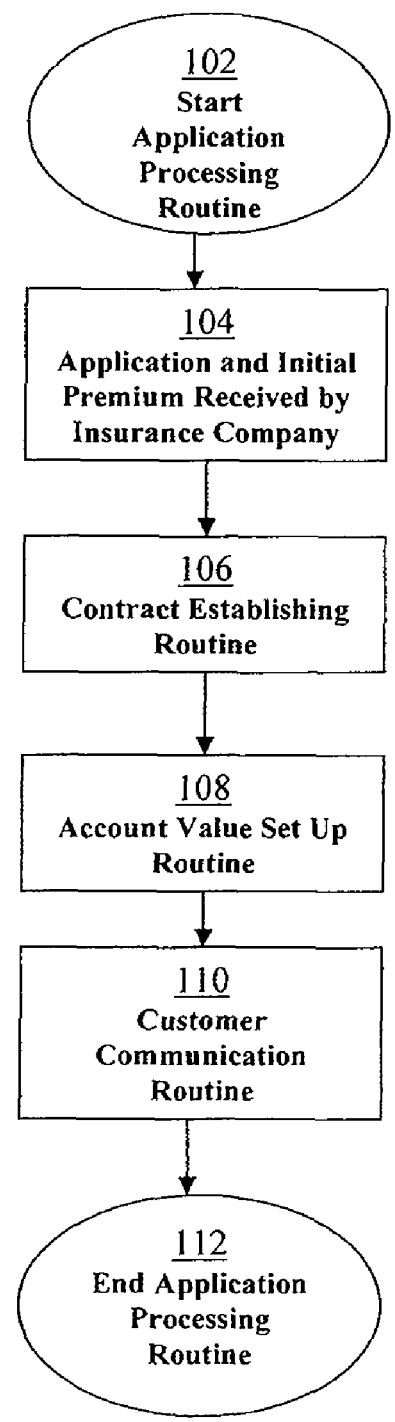
FIG. 1 is a flow chart illustrating the manner in which a new annuity contract application is processed.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. They are deemed to afford the best embodiment for purposes of disclosure; but should not be construed as limiting the scope of the invention. The following presents a detailed description of the preferred embodiment of the present invention.

The present invention comprises a data processing method for administering an annuity contract having a contract value and a guaranteed minimum interest rate. As used herein, the term annuity contract means a set of rules and other data that are reflected in a computer processing system for operations of the annuity product. In the present invention, the data processing method provides for periodic interest payments and periodic inflation bonus payments. The inflation bonus payments are based on changes in the consumer price index. The present data processing method may be in the form of a rider to a fixed annuity contract. In another aspect of the invention, the present data processing method is not in the form of a rider, but is a part of the base contract. In exchange for receiving a slightly lower guaranteed interest rate for the term of the contract, the annuitant receives several advantages by selecting the present annuity product, which provides for periodic inflation bonuses based upon changes in the consumer price index. One such advantage is that the annuitant will receive an immediate increase on the interest earned on his/her contract when inflation increases, because an increase in inflation is usually directly and explicitly linked to the consumer price index.

It should be understood that as used herein the term periodically includes method steps that in certain aspects may only be performed once. In other aspects, such periodically performed method steps may be performed more than once as described herein.

The following definitions are given hereunder to better understand terms used in the specification.

Relevant Life or Covered Life: The term relevant life or covered life is the governing life for determination of the living benefits provided under this illustrative embodiment. Covered life (or relevant life) may refer to any one or more of the following: an owner, joint owner, annuitant, joint annuitant, co-owner, co-annuitant or beneficiary.

Premium: 100% of the dollar amount of the initial or subsequent premium payments deposited into the contract before application of any sales charges or payment enhancements.

Contract Value: The contract value (CV) is a numerical measure of the relative worth of a variable annuity product during the accumulation phase. The contract value is determined by adding the amount of purchase payments made during the accumulation phase, deducting management fees, deducting contract fees, deducting optional rider fees and surrenders made by the owner, and adjusting for the relative increase (or decrease) of the investment option(s) chosen by the owner. It should be understood that in other embodiments of the present invention, other formulas may be utilized for determining the contract value.

Subaccount: Variable account investments within the variable annuity contract, such as mutual funds, stocks and bonds.

Annuity Commencement Date: The annuity commencement date (ACD) is the date upon which the contract enters the annuitization phase.

Adjustment Factor. A factor that is included in the formula that is used when determining the lifetime benefit payment and which helps to protect against inflation. Preferably, the adjustment factor is modified over time and is related to the number of deferred years waited by the relevant life until a first lifetime benefit payment withdrawal is requested.

Annuity Contract: The term annuity contract means a set of rules and other data that are reflected in a computer processing system for operations of the annuity product.

Issue Rules: The issuance of a contract may be subject to established requirements known as issue rules.

The following detailed illustrative embodiment(s) is presented to provide a more complete understanding of the invention. The specific techniques, systems, and operating structures set forth to illustrate the principles and practice of the invention may be embodied in a wide variety of sizes, shapes, forms and modes, some of which may be quite different from those in the disclosed embodiment. Consequently, the specific structural and functional details disclosed herein are exemplary. They are deemed to afford the best embodiment for purposes of disclosure; but should not be construed as limiting the scope of the invention.

Covered Life in Single and Joint/Spousal Election(s)

The covered life, or relevant life, may have a single life election or joint/spousal continuation election as described more fully herein.

Single Life Election:

If a natural owner, the covered life is the owner and the joint owner (if any) on the rider effective date. If a non-natural owner, the covered life is the annuitant on the rider effective date. All age-contingent benefit provisions are based on the attained age of the oldest covered life.

Joint/Spousal Continuation Election:

If a natural owner, the covered life is both spouses (as defined by Federal Law). All age-contingent benefit provisions are based on the attained age of the youngest covered life.

Issue Rules

The following issue rules are set forth to provide a more complete understanding of this illustrative embodiment of the present invention. It should be understood by those skilled in the art that these issue rules are set forth for illustrative purposes only and that other rules may be utilized. Accordingly, the issue rules set forth below should not be construed as limiting the scope of the invention.

The issue rules may include a maximum issue age. In one embodiment, the riders are not available if any covered life or annuitant is age 81 (or other predetermined age) or greater on the rider effective date. In another embodiment, the riders are not available if any covered life or annuitant is age 76 (or other predetermined age) or greater on the Rider effective date. The rider may be elected on contract issue or post-issue.

Additional Annuity Contract(s) Rules

Additional terms of the contract(s) or rider(s) include the following. The benefits under the contract cannot be assigned. If the free look provision under the contract is exercised, the rider will terminate.

Turning now to the figures, FIG. 1 illustrates the manner in which a new annuity contract application is processed. The new application processing routine starts (block 102) when an application is completed. The annuity contract application and initial premium are received by the insurance company (block 104). The annuity contract is then established through the contract establishing routine (block 106) as further described in FIG. 2. After the annuity contract is established, the account value is then set up through the account value set routine (block 108), via the computer systems, as further specified in FIG. 3. Thereafter customer communication is established through the customer communication routine (block 110) as further specified in FIG. 4. The application processing routine ends at (block 112).

Figure 2:
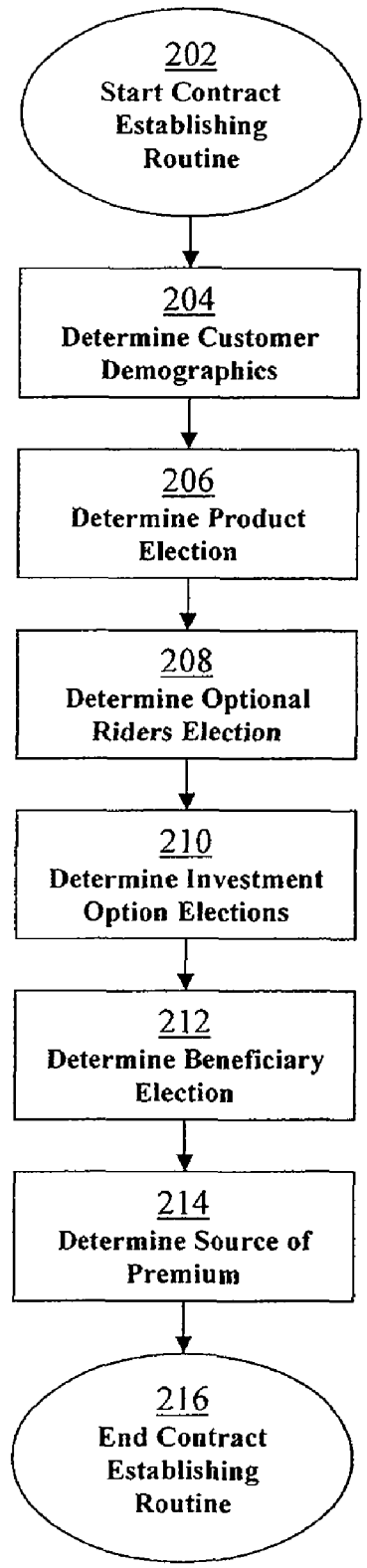
FIG. 2 is a flow chart that illustrates in more detail the manner in which an annuity contract is established.

FIG. 2 is a flow chart that illustrates in more detail the manner in which an annuity contract is established. The annuity contract establishing routine starts at (block 202). After receiving the annuity contract application, customer demographics are determined (block 204). The customer demographics and other data from the annuity contract application are transmitted to the insurance company by any suitable means, such as electronic transmission, facsimile transmission, telephonic transmission, and the like. The customer demographics may be scanned in or electronically entered into the computer system by the insurance company after the demographic data is determined. Such demographic information may include age, gender, date of birth, social security number, address, marital status, and the like. The customer demographics may be used for a variety of purposes, such as identification purposes or to locate a relevant life by searching his/her social security number. The customer demographics are also used when determining and/or calculating a variety of factors that are related to the annuity contract, such as benefit amount calculations, tax considerations, and the like. The types of customer demographics that are determined are generally related to the type of annuity contract application that is filled out by the relevant life. The specific product election is determined (block 206). For example, the specific product may be elected from a group of different variable annuity products, which each have different characteristics including the costs and fees as well as the liquidity features associated therewith. The election of optional riders is determined (block 208). For example, the optional riders may be elected from a group of different riders, which each have various guaranteed withdrawal features. The election of investment options is determined (block 210). For example, the investment options include money market funds, bond funds, stock funds, and the like. The beneficiary is elected (block 212). In one aspect, this is the person who will collect the death benefits, if any. The source of the premium is determined (block 214). For example, the source of the premium may come from the relevant life s personal funds or may come from another annuity in the form of a transfer. It should be understood that the steps taken for establishing the contract may proceed in various orders and that the order shown in FIG. 2 is for illustrative purposes only and is only one embodiment of said steps. The contract establishing routine ends at (block 216).

Figure 3:
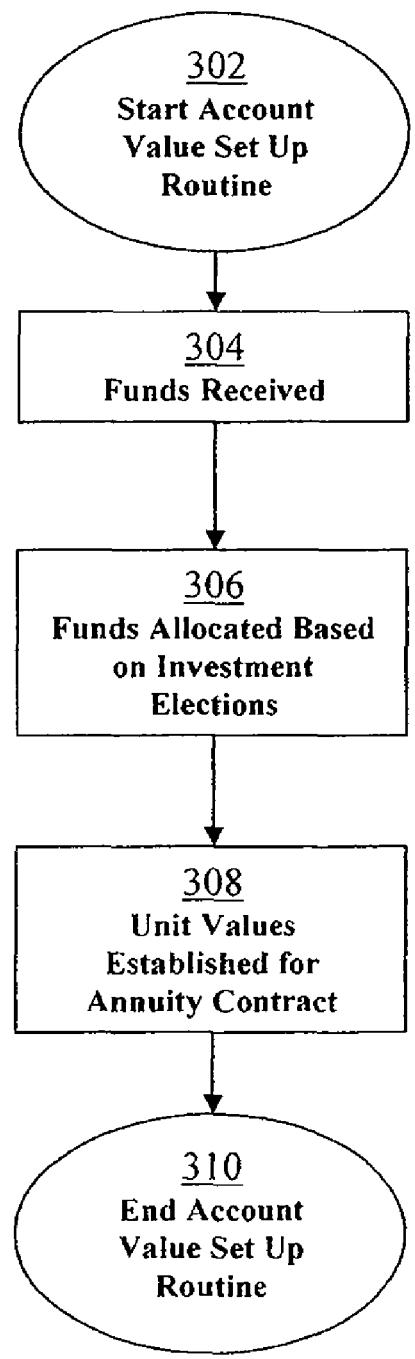
FIG. 3 is a flow chart that illustrates in more detail the manner in which an account value is set up.

FIG. 3 is a flow chart that illustrates in more detail the manner in which an account value is set up. The account value set up routine starts at (block 302). The funds are received (block 304). For example, the funds may be received via electronic transfer from a bank account or from another variable annuity holder. The funds are then allocated based on investment elections (block 306). For example, the allocations can be accomplished through a computerized system according to the investment elections by the relevant life. Unit values are established for the annuity contract (block 308). For example, based on the performance of the underlying investment elections, unit values are established, preferably on a daily basis, for use in determining the resulting impact on the relevant life s annuity contract based on their specific fund allocations. For example, the number of units that are applied to each annuity contract is different for each relevant life based on the number of units held within the annuity contract. It should be understood that the steps taken for setting up the account value may proceed in various orders and that the order shown in FIG. 3 is for illustrative purposes only and is only one embodiment of said steps. The account value set up routine ends at (block 310).

Figure 4:
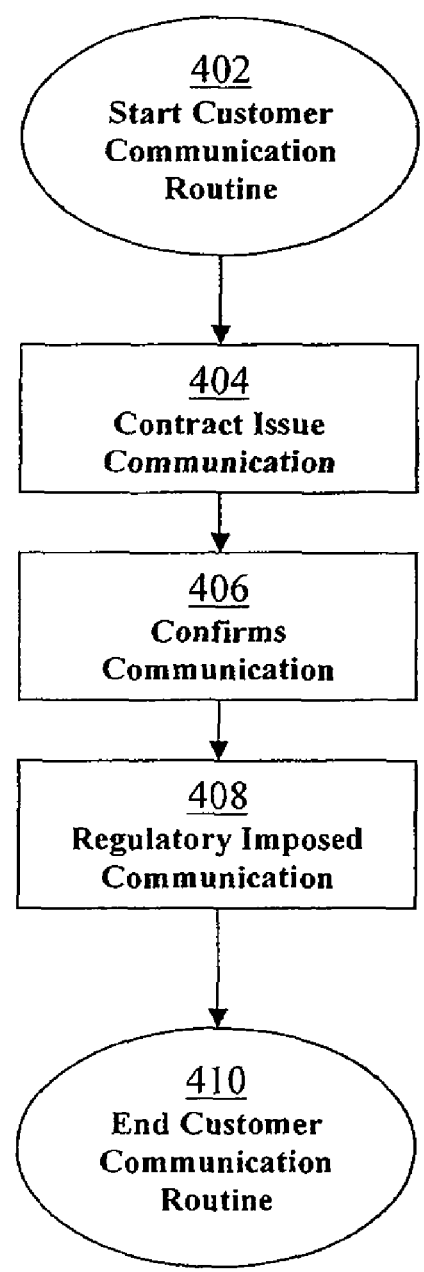
FIG. 4 is a flow chart that illustrates in more detail the manner in which customer communication is established.

FIG. 4 is a flow chart that illustrates in more detail the manner in which customer communication is established. The customer communication routine starts at (block 402). Communications with the customer may be accomplished via email, facsimile, letter, telephone, and the like. Communication with the customer in one aspect relates to the issuing of the contract (block 404). Communication with the customer in one aspect relates to the relevant confirmation of the previous contract issuance communication (block 406). Any regulatory-imposed communication with the client is accomplished (block 408). It should be understood that the steps taken for establishing customer communication may proceed in various orders and that the order shown in FIG. 4 is for illustrative purposes only and is only one embodiment of said steps. The customer communication routine ends at (block 410).

Figure 5:
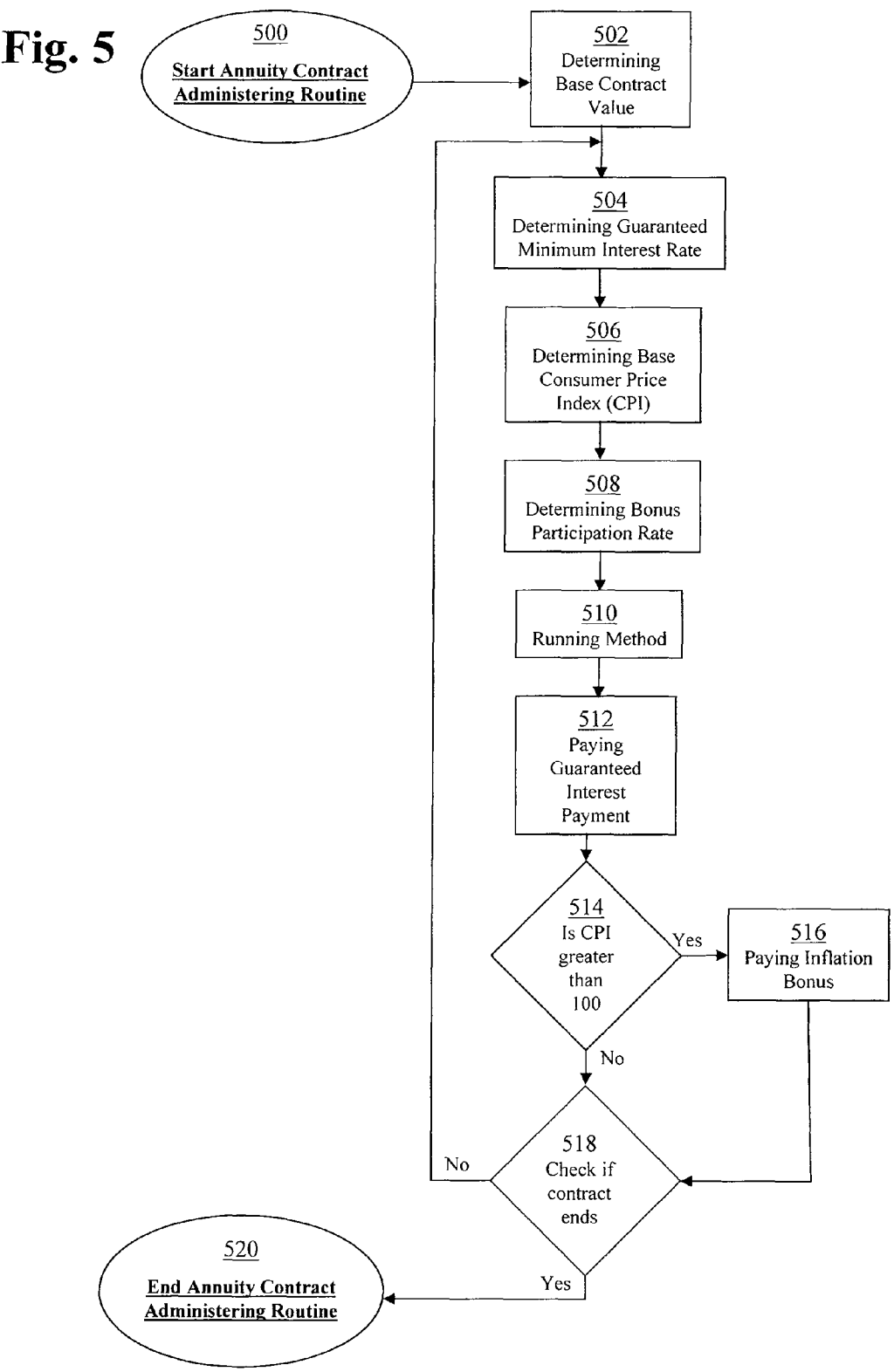
FIG. 5 is a flow chart illustrating a data processing method for administering an annuity contract for an annuitant in accordance with an embodiment of the present invention.

FIG. 5 is a flow chart illustrating a data processing method for administering an annuity contract for an annuitant in accordance with an embodiment of the present invention. It should be understood that the order of the successive method steps is shown for the sake of illustrating but one example and that the order of method steps can proceed in a variety of order sequences. In an embodiment of the present invention, the invention comprises a data processing method for administering an annuity contract for an annuitant, the annuity contract having a contract value and a guaranteed minimum interest rate. The present method comprises the following steps. The annuity contract administering routine starts (block 500), and the present method sometime later proceeds to determine a base contract value at the issue of the annuity contract (block 502). The present method determines a guaranteed minimum interest rate (block 504). The present method then determines the Consumer Price Index (CPI) at the issue of the annuity contract and sets this value as the base Consumer Price Index (block 506). The present method proceeds by determining a bonus participation rate, which may range from 0% to 100% (block 508). Once the starting data values are determined via the steps of the present method as described above, the method can run (block 510), wherein the guaranteed interest payment and the inflation bonus if applicable is calculated. The present method pays a guaranteed interest payment to the present contract value (block 512), wherein the guaranteed interest payment is determined by the following formula:

$$\text{Guaranteed Interest Payment} = (\text{the Present Contract Value}) \times (\text{the Guaranteed Minimum Interest Rate}).$$

Additionally, the present method determines whether the Consumer Price Index as determined at (block 506) is larger than 100 (block 514). If it is determined that the Consumer Price Index is larger than 100 then the present method pays an inflation bonus to the present contract value (block 516), wherein the inflation bonus is determined based on the difference between the base Consumer Price Index and the present Consumer Price Index. Upon paying an Inflation Bonus, the present method determines if the contract ends (block 518), according to predetermined contract rules. Additionally, if the Consumer Price Index is less than 100, then no Inflation Bonus is paid and the present method determines if the contract ends (block 518), according to predetermined contract rules. If it is determined that the contract does not end at (block 518), the process proceeds back to (block 504), wherein a guaranteed minimum interest rate is determined and the present method follows along the same steps as previously discussed. Once it is determined via predetermined contract rules that the contract should end, the annuity contract administering routine of the present method ends at (block 520).

Figure 6:
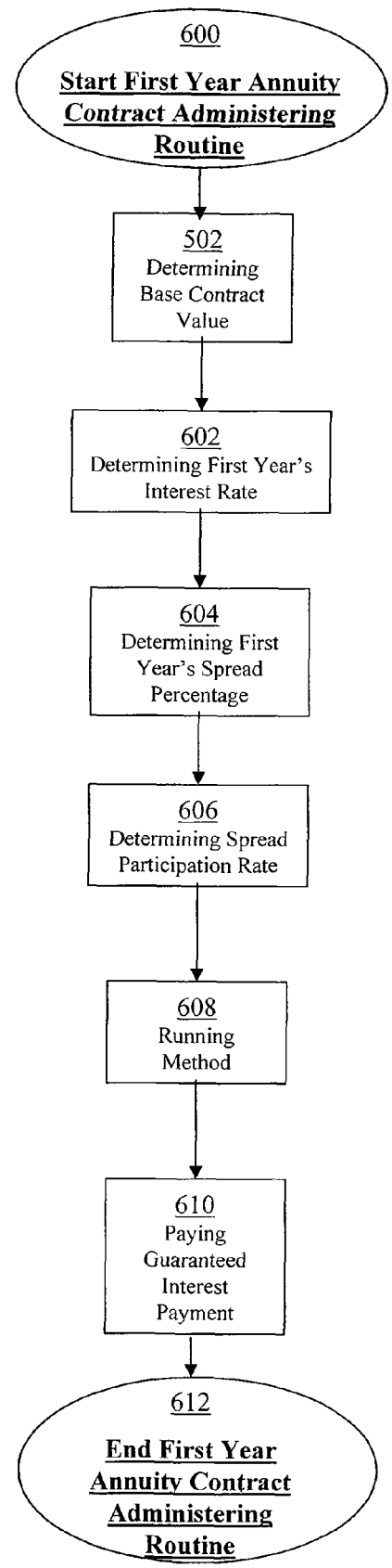
FIG. 6 is a flow chart illustrating a data processing method for administering a first year annuity contract for an annuitant in accordance with an embodiment of the present invention.

FIG. 6 is a flow chart illustrating a data processing method for administering a first year annuity contract for an annuitant in accordance with an embodiment of the present invention. It should be understood that the order of the successive method steps is shown for the sake of illustrating but one example and that the order of method steps can proceed in any variety of orders. In an embodiment of the present invention, the invention comprises a data processing method for administering an annuity contract for an annuitant, the annuity contract having a contract value and a guaranteed minimum interest rate. The present method comprises the following steps. The first year annuity contract administering routine starts (block 600), and at sometime later proceeds to determine a base contract value at the issue of the annuity contract (block 502). The present method determines a guaranteed minimum interest rate and sets this as the first year s interest rate (block 602). The first year s spread percentage is determined (block 604) by calculating the difference between a long term Treasury interest rate and a short term Treasury interest rate at the issue of the annuity contract. The present method proceeds by determining a spread participation rate, which may range from 0% to 100% (block 606). Once the starting data values are determined via the steps of the present method as described above, the method can run (block 608), wherein the guaranteed interest payment is calculated. The present method periodically pays a guaranteed interest payment to the present contract value (block 610), wherein the guaranteed interest payment is determined by the following formula:

Guaranteed Interest Payment=(the Present Contract Value)×(the Interest Rate), wherein the interest rate is determined by the following formula:

(the Interest Rate)=[(the previous year s Interest Rate)+(the Spread Participation Rate)×the greater of: i. (the difference between the present long term Treasury interest rate and the present short term Treasury interest rate) minus (the previous year s spread percentage); and ii. Zero].

The first year annuity contract administering routine of the present method ends at (block 612).

Figure 7:
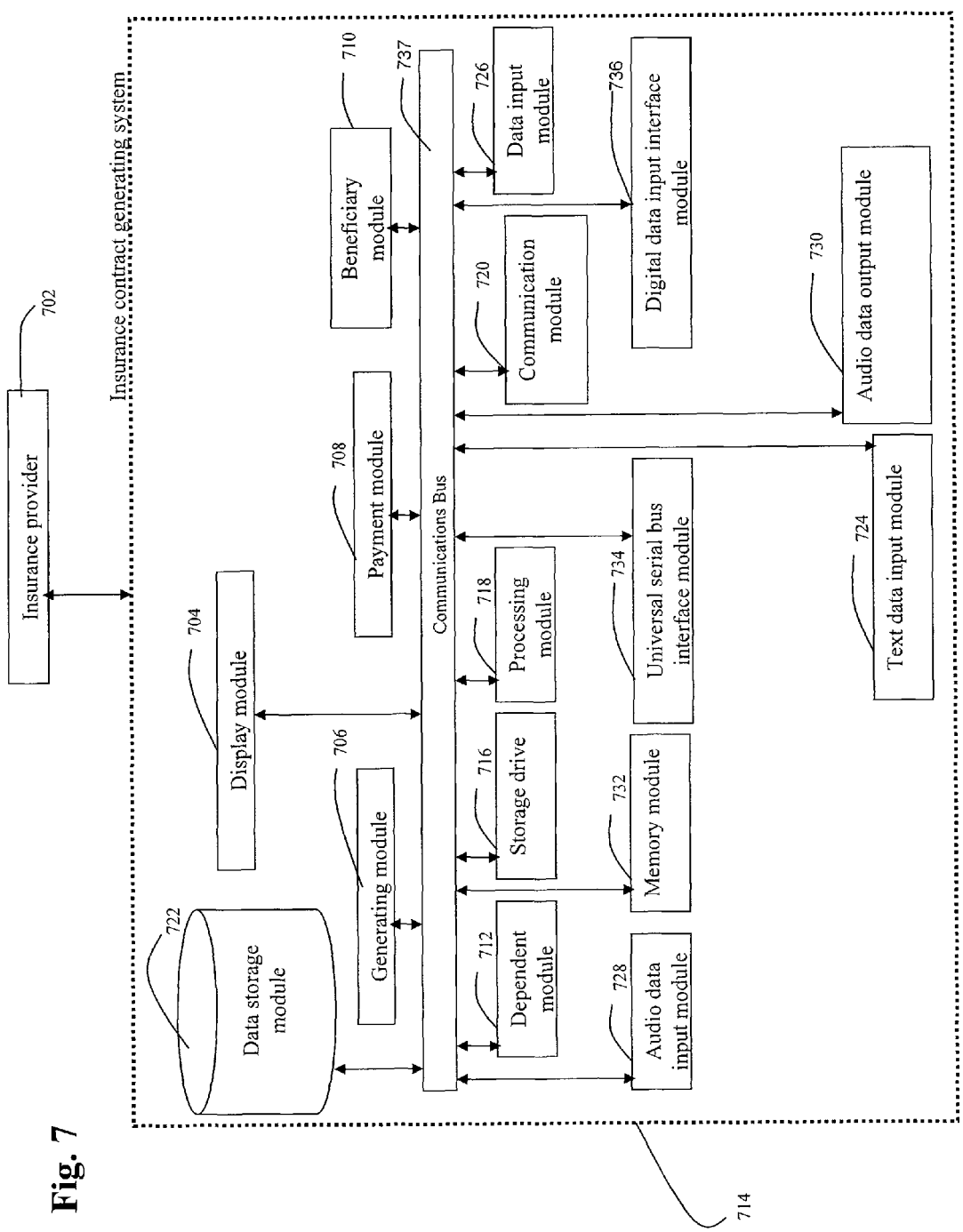
FIG. 7 is a diagram illustrating the system on which the methods of the present invention may be implemented in accordance with an embodiment of the present invention.

Referring next to FIG. 7, depicted is a preferred embodiment of a system on which the methods of the present invention may be implemented. In one example of the preferred embodiment, the insurance contract generating system 714 would generally be used by an insurance provider 702, however the system may be operated by any individual or organization offering an insurance product as outlined in the present specification without departing from the spirit of the present invention. System 714 may be implemented in many different ways such as part of a single standalone server or as a network server or servers, which may be distributed across multiple computing systems and architectures. Preferably, the central processing computer or network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server.

The network server may also be configured in a distributed architecture, wherein the server components or modules are housed in separate units or locations. Each of the modules described may be implemented as single servers or one or more or all of the modules may be incorporated into a single server. These servers will perform primary processing functions and contain at a minimum, a RAM, a ROM, and a general controller or processor. In such an embodiment, each server is connected to a communications hub or port that serves as a primary communication link with other servers, clients or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

In the preferred embodiment, all of the modules described herein are operably inter-connected via a central communications bus 738. The communications bus 738 is able to receive information from each of the modules, as well as to transmit information from one module to another. The insurance contract generating system 714 further includes a display module 704, and a generating module 706. The generating module is used for generating an insurance contract, wherein the insurance contract provides coverage to an individual or group for at least one event defined in the insurance contract.

The insurance contract generating system 714 additionally includes a payment module 708 for making payments to an insured individual or group for a predetermined period of time as defined by the deferred annuity insurance contract.

The system further comprises a beneficiary module 710 for choosing a beneficiary to receive payments from the insurance provider in the instance of an insured individual s death. Furthermore, the system comprises a dependent module 712 for offering an insurance contract structured according to the methods of the present invention to dependents of an individual eligible for the insurance contract described herein.

Additionally, the insurance contract generating system 714 includes: a storage drive 716 for receiving data stored on a storage disc, a processing module 718 for processing digital data received by and contained in the insurance contract generating system 714, a communication module 720 for bi-directional communication with external and telecommunications systems, a data storage module 722 for storing and managing digital information, a text data input module 724 for inputting data in the form of text, and a data input module 726 for converting to digital format documents and images and inputting them into the insurance contract generating system 714.

Finally, the insurance contract generating system 714 includes: an audio data input module 728 for receiving and inputting audio information, an audio data output module 730 for outputting data in audio format (i.e. recorded speech, synthetically generated speech from digital text, etc), a memory module 732 for temporarily storing information as it is being processed by the processing module 718, a universal serial bus interface module 734 for receiving and transmitting data to and from devices capable of establishing a universal serial bus connection, and a digital data input interface module 736 for receiving data contained in digital storage devices.

Data storage device may include a hard magnetic disk drive, tape, optical storage units, CD-ROM drives, or flash memory. Such data storage devices generally contain databases used in processing transactions and/or calculations in accordance with the present invention. In one embodiment, the database software creates and manages these databases. Insurance-related calculations and/or algorithms of the present invention are stored in storage device and executed by the CPU.

The data storage device may also store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, and each record includes fields that are specific to the present invention such as interest rates, contract value, payment base value, step-ups, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as providing a deferred annuity insurance contract to an individual, generating a deferred annuity insurance contract, and making payments to the individual as defined in the deferred annuity insurance contract. The functions described above are merely exemplary and should not be considered exhaustive of the type of function, which may be performed by the computer program code of the present inventions.

The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and device drivers that allow the processor to interface with computer peripheral devices (e.g., a video display, a keyboard, a computer mouse, etc).

For example, a user provides instructions for the amount of the living benefit payment that is requested. It should be understood that the user may communicate with the computing system directly or indirectly through another party, such as the insurance provider 702. In the event the user communicates with an insurance provider 702, the insurance provider 702 then receives and transfers information, to and from the insurance contract generating system 714 via the text data input module 724, audio data input module 728, audio data output module 730 and the display module 704. For example, the relevant life may provide instructions to the insurance provider 702 indicating the amount of living benefit payments the relevant life would like to receive. Furthermore, as used herein the data storage module 722 is also referred to as a storage device. The processing module 718 is contained within the insurance contract generating system 714, which is coupled to the storage device, the storage device stores instructions that are utilized by the processor. The instructions comprise: (i) an instruction for calculating a base contract value; (ii) an instruction for determining a guaranteed minimum interest rate; (iii) an instruction for determining a base Consumer Price Index; (iv) an instruction for determining a bonus participation rate; and (v) an instruction for calculating a guaranteed interest payment; wherein the guaranteed interest payment is determined by the following formula:

Guaranteed Interest Payment=(the Present Contract Value)×(the Guaranteed Minimum Interest Rate).

It should be understood that several of the method steps of the present invention require input from the owner (i.e., payment of premiums) in order to be able to determine the respective values. After receiving that input, however, a computer is required to use the method of the present invention; the calculations and appropriate data records are performed by a computer. For example, the base contract value is related to premium payments by the annuitant, wherein some of the premium payments may be discretionary. The guaranteed minimum interest rate is dependent on a pre-selected percentage selected by the annuitant and/or the company issuing the annuity. The base consumer price index is preferably established based on the current market statistics, as reported by a governing body. The bonus participation rate is discretionary and is selected by the annuitant and/or the company issuing the annuity.

In other embodiments of the invention, the first year s interest rate is dependent on a pre-selected percentage selected by the company issuing the annuity and/or the annuitant. The first year s spread percentage is preferably established based on the current market statistics for short and long term Treasury interest rates, as reported by a governing body. The spread participation rate is discretionary and is selected by the company issuing the annuity and/or the annuitant.

In a preferred embodiment, the inflation bonus is determined by the following formula:

inflation bonus=the greater of: (the base contract value)×(the bonus participation rate)×1/100×([(the present Consumer Price Index)/(base Consumer Price Index)]'1); and zero.

It should be understood that other formulas may be utilized for determining the inflation bonus. It is preferred that the formula for determining the inflation bonus will include reference to the consumer price index, as reported by any governing body. Such governing body is preferably the United States federal government. More preferably, the governing body is the United States Department of Labor, Bureau of Labor Statistics.

The present method is preferably utilized with a fixed annuity product. However, other types of annuity products, such as hybrid annuities that include a variable rate and a fixed rate may be used with the present method.

In a preferred embodiment of the present method, each of the guaranteed interest payment and the inflation bonus are paid to the present contract value at the same time. For example, each of the guaranteed interest payment and the inflation bonus are paid to the present contract value on the same calendar day or within a predetermined time period of each other. Further, it is preferred that each of the guaranteed interest payment and the inflation bonus are paid to the present contract value on a yearly basis. Other payment options may include quarterly, monthly, bi-weekly, weekly, daily, etc. In another embodiment, each of the guaranteed interest payment and the inflation bonus are paid to the present contract value at the same time and on a yearly basis, respectively.

In another embodiment, the present invention discloses a system for administering an annuity product for an annuitant, comprising: (i) means for determining a base contract value at the issue of the annuity product; (ii) means for determining a guaranteed minimum interest rate; (iii) means for determining the consumer price index at the issue of the annuity product and setting this value as the base consumer price index; (iv) means for determining a bonus participation rate between 0% and 100%; (v) means for periodically paying a guaranteed interest payment to the present contract value, wherein the guaranteed interest payment is determined by the following formula:

guaranteed interest payment=(the present contract value)×(the guaranteed minimum interest rate); and (vi) means for periodically paying an inflation bonus to the present contract value, wherein the inflation bonus is determined based on the difference between the base consumer price index and the present consumer price index.

In accordance with a second aspect of the present invention, a data processing method for administering an annuity product for an annuitant is disclosed, wherein the annuity product has a contract value and a guaranteed minimum interest rate. In this aspect of the invention, the method provides for a guaranteed minimum interest rate. The guaranteed minimum interest rate may be increased based on the (difference between the present long term Treasury interest rate and the present short term Treasury interest rate) minus (the previous year s spread percentage). The previous year s spread percentage will be equal to the difference between the previous year s long term Treasury rate and the previous year s short term Treasury rate. The present data processing method may be in the form of a rider to a fixed annuity contract. In exchange for receiving a slightly lower guaranteed interest rate for the term of the contract, the annuitant receives several advantages by selecting the present annuity product, which provides for periodic inflation bonuses, according to changes in the difference between the long term Treasury rate and the short term Treasury rate. One such advantage is that the annuitant will receive an increase on the interest earned on their contract when prevailing market interest rates rise because an increase in market interest rates is accurately tracked by examining the yearly differences between two reference rates, such as, a long term Treasury rate and a short term Treasury rate. On the other hand, when using only a single reference rate, predictions of market interest rates becomes more tenuous.

In one embodiment of the present invention, the long term Treasury interest rate is a 10 year Treasury rate. Other long term Treasury interest rates may include 5 to 100 year Treasury rates. In one embodiment of the present invention, the short term Treasury interest rate is a 1 year Treasury rate. Other short term Treasury interest rates may include 1 month to 5 year Treasury rates.

In another embodiment, the present invention discloses a system for administering an annuity product for an annuitant, comprising: (i) means for determining a base contract value at the issue of the annuity product; (ii) means for determining a guaranteed minimum interest rate and setting this as the first year s interest rate; (iii) means for determining the difference between a long term Treasury interest rate and a short term Treasury interest rate at the issue of the annuity product and setting this value as the first year s spread percentage; (iv) means for determining a spread participation rate between 0% and 100%; (v) means for periodically paying a guaranteed interest payment to the present contract value, wherein the guaranteed interest payment is determined by the following formula:

guaranteed interest payment=(the present contract value)×(the interest rate), wherein the interest rate is determined by the following formula:

(the interest rate)=[(the previous year s interest rate)+ (the spread participation rate)×the greater of: (the difference between the present long term Treasury interest rate and the present short term Treasury interest rate) minus (the previous year s spread percentage); and Zero]

The following description and examples further illustrate the preferred features of the different embodiments of the present invention by way of examples.

In the first aspect of the present invention, a fixed annuity is provided that pays a guaranteed interest rate for the life of the contract. At the beginning of each subsequent year, an inflation bonus is determined and credited to the contract. The inflation bonus depends on changes in the consumer price index (CPI). If the CPI increases from one year to the next, a percentage (between 0% and 100%) of this increase, referred to as the bonus participation rate, is credited to the account value. Preferably, the bonus participation rate will remain constant for the life of the contract. If the CPI decreases or remains constant, no inflation bonus is paid for that year, but the guaranteed interest rate is still applied to the contract resulting in a guaranteed interest payment. Example 1 below further illustrates the present method and system, according to the first aspect of the present invention.

EXAMPLE 1

| Issue Date | |
|---|---|
| Premium Deposit: | 100,000 |
| Guaranteed interest rate: | 3% |
| CPI Index (at issue): | 100 |
| Bonus Participation rate (all years): | 50% |
| Beginning of Second Year | |
| Interest Credited: | 3,000 (3%*100,000) |
| CPI Index: | 110 |
| Increase in CPI: | 10% [max (110/100−1, 0)] |

-continued

| | |
|---|---|
| Inflation Bonus: | 5,000 (100,000*50%*10%) |
| Account Value: | 108,000 (100,000 + 3,000 + 5,000) |
| Beginning of Third year | |
| Interest Credited: | 3,240 (3%*108,000) |
| CPI Index: | 90 |
| Increase in CPI: | 0% [Max (90/100-1, 0)] |
| Inflation Bonus: | 0 (100,000*50%*0%) |
| Account Value: | 111,240 (108,000 + 3,240 + 0) |

In the second aspect of the present invention, the interest-spread annuity is a fixed annuity that pays a guaranteed interest rate for the first year of the contract. At the beginning of each subsequent year, the interest rate is re-determined. The new interest rate declared for each subsequent year is the interest rate for the prior year plus an enhancement that is based on observed annual changes in the spread between two designated interest rates. Preferably, the two designated interest rates include one long-term interest rate and one short-term interest rate (e.g. 10 year Treasury minus 1-yr Treasury, 10-yr swap rate minus 1-yr swap rate, etc.)

If the spread (difference) between the two designated rates increases from one year to the next, a percentage (between 0% and 100%) of this increase in spread is added to the prior year s interest rate. If the spread decreases or remains constant, the prior year s interest rate will apply for the current year. The percentage applicable to the change in spread may change from one year to the next. Example #2 below further illustrates the present method and system, according to the second aspect of the present invention.

EXAMPLE 2

| | |
|---|---|
| Issue Date | |
| Guarantee Period: | 3 years |
| Guaranteed interest rate for 1$^{st}$ yr: | 5% |
| Spread between 10-yr Treasury and 1-yr Treasury (at issue) | 1% |
| Interest rate for first year: | 5% |
| Spread Participation rate (all years): | 100% |
| Beginning of Second Year | |
| Spread between 10-yr Treasury and 1-yr Treasury: | 2% |
| Increase in yield spread: | 1% [2% – 1%] |
| Interest rate for 2$^{nd}$ year: | 6% [5% + 100%* Max (2% – 1%, 0%)] |
| Beginning of Third year | |
| Spread between 10-year Treasury and 1-yr Treasury: | –2% |
| Increase in yield spread: | 0% [Max (–2% –2%, 0)] |
| Interest rate for 3$^{rd}$ year: | 6% |

Having thus described the invention in rather full detail, it will be understood that such detail need not be strictly adhered to, but that additional changes and modifications may suggest themselves to one skilled in the art, all falling within the scope of the invention as defined by the subjoined claims.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A computer system for processing data related to an annuity product, the annuity product having a contract value, and an interest rate, said system comprising:
   a data storage device having stored therein data indicative of the contract value and a value of the interest rate; and
   a processor in communication with the data storage device, the processor configured to:
   access the stored data indicative of the contract value and the value of the interest rate;
   access a current value of an index having a value not dependent on a value of any financial instrument and independent of the interest rate, and a prior period value of the index;
   determine a value of amount of interest for crediting to the contract value based on the contract value and the value of the interest rate;
   determine a difference between the current value of the index and the prior period value of the index;
   based on the determined difference between the current value of the index and the prior period value of the index, determine a value of a bonus amount for crediting to the contract value;
   based on the contract value, the amount of interest for crediting and the value of the bonus amount for crediting, determine an updated contract value; and
   provide an output signal having data indicative of the updated contract value to a further system for reporting the determined updated contract value to an owner of the annuity product.

2. The computer system of claim 1, wherein the index has values linked to inflation.

3. The computer system of claim 2, wherein the index is a price index.

4. The computer system of claim 3, wherein the index is a consumer price index.

5. The computer system of claim 1, wherein the processor is further configured to access data indicative of a participation rate and to determine the value of the bonus amount for crediting to the contract value based further on the participation rate, the participation rate being in the range of 0% to 100%.

6. The computer system of claim 1, wherein, responsive to the processor determining that the current value of the index is not greater than the prior period value of the index, determining that the value of the bonus amount is zero.

7. The computer system of claim 1, wherein the prior period value of the index is a value of the index at a date one year prior to a current date.

8. The computer system of claim 1, wherein the further system is an insurance document generating system, and the insurance document generating system is configured to generate one or more documents for reporting the updated contract value to an owner of the annuity product.

9. A computer-implemented method for processing data related to an annuity product, the annuity product having a contract value and an interest rate, comprising:
   accessing by a processor of a computer from a memory storage device data stored in the memory storage device, the accessed stored data including data indicative of the contract value, the value of the interest rate, a current value of an index independent of a value of any financial security and independent of the interest rate, and a prior period value of the index;

determining by the processor a value of an amount of interest for crediting to the contract value based on the contract value and the value of the interest rate;

determining by the processor a value of an increase in the value of the index from the prior period value of the index to the current value of the index;

based on the determined value of the increase in the value of the index, determining by the processor a value of a bonus amount for crediting to the contract value;

adding by the processor the determined amount of interest and the determined value of the bonus amount to the contract value to determine an updated contract value; and providing by the processor an output signal having data indicative of the updated contract value to a communications bus for further transmission.

10. The computer-implemented method of claim 9, wherein the index is a price index.

11. The computer-implemented method of claim 10, wherein the index is a consumer price index.

12. The computer-implemented method of claim 9, wherein the annuity product is a fixed annuity.

13. The computer-implemented method of claim 12, wherein the interest rate is fixed for the term of the annuity.

14. The computer-implemented method of claim 9, wherein the value of the bonus amount is further determined by multiplying, by the processor, the determined value of the increase in the value of the index, expressed as a percentage, by the contract value and further by a bonus participation rate having a value in the range from 0% to 100%.

15. The computer-implemented method of claim 9, wherein the prior period value of the index is a value of the index one year prior to the date of the current value of the index.

16. A non-transitory computer-readable medium having processor-executable instructions stored thereon, which instructions, when executed by a processor, cause the processor to:

access from a memory storage device data indicative of a contract value of an annuity contract issued by an issuer to a contract owner, a value of a guaranteed interest rate associated with the annuity product, a current value of an index linked to an inflation rate and independent of a value of any financial instrument and independent of the interest rate, and a prior period value of the index;

determine a value of an amount of interest for crediting to the contract value based on the contract value and the value of the guaranteed interest rate;

determine a value of an increase in the value of the index from the prior period value of the index to the current value of the index;

based on the determined value of the increase in the value of the index, determine a value of a bonus amount for crediting to the contract value; and providing by the processor an output signal having data indicative of the value of the bonus amount to a communications bus for further transmission and reporting to the contract owner.

17. The non-transitory computer-readable medium of claim 16, wherein the instructions further cause the processor to determine the value of the amount of interest for crediting to the contract value and the value of the bonus amount for crediting to the contract value on a periodic basis and at the same time.

18. The non-transitory computer-readable medium of claim 17, wherein the periodic basis is an annual basis.

19. The non-transitory computer-readable medium of claim 16, wherein the index is a consumer price index.

20. The non-transitory computer-readable medium of claim 16, wherein the instructions further cause the processor to access data indicative of a value of a bonus participation rate, the bonus participation rate value being between 0% and 100%, and to employ the accessed value of the bonus participation rate in determining the value of the bonus amount for crediting to the contract value.

* * * * *